(12) United States Patent
Miyazaki et al.

(10) Patent No.: US 11,194,215 B2
(45) Date of Patent: Dec. 7, 2021

(54) ELECTROCHROMIC DEVICE, OPTICAL FILTER USING SAME, LENS UNIT, IMAGE TAKING DEVICE, WINDOW MEMBER, AND DRIVING METHOD FOR ELECTROCHROMIC ELEMENT

(71) Applicant: CANON KABUSHIKI KAISHA, Tokyo (JP)

(72) Inventors: Kazuya Miyazaki, Kunitachi (JP); Wataru Kubo, Inagi (JP); Jun Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 16/413,477

(22) Filed: May 15, 2019

(65) Prior Publication Data

US 2019/0265569 A1    Aug. 29, 2019

Related U.S. Application Data

(63) Continuation of application No. PCT/JP2017/039880, filed on Nov. 6, 2017.

(30) Foreign Application Priority Data

Nov. 17, 2016  (JP) .............................. JP2016-224386

(51) Int. Cl.
*G02F 1/163*  (2006.01)
*G02F 1/155*  (2006.01)
(Continued)

(52) U.S. Cl.
CPC .............. *G02F 1/163* (2013.01); *G02F 1/155* (2013.01); *G02F 1/157* (2013.01); *G09G 3/38* (2013.01); *G02F 1/1516* (2019.01); *G02F 1/1525* (2013.01)

(58) Field of Classification Search
CPC .......... G02F 1/163; G02F 1/155; G02F 1/157; G02F 1/1516; G02F 1/1525; G02F 2201/56; G09G 3/00; G09G 3/38
See application file for complete search history.

(56) References Cited

U.S. PATENT DOCUMENTS

| 2003/0227663 A1 | 12/2003 | Agrawal |
| 2015/0362818 A1 | 12/2015 | Greer |
| 2019/0025663 A1* | 1/2019 | Suzuki .................. G02F 1/1506 |

FOREIGN PATENT DOCUMENTS

| JP | 63-305326 A | 12/1988 |
| JP | 9-120088 A | 5/1997 |

(Continued)

OTHER PUBLICATIONS

Michaelis, Alexander et al., "Electrochromic Dye System for Smart Window Applications", Adv. Mater. 2001, 13, No. 23, December 3, pp. 1825-1828.

*Primary Examiner* — Tuyen Tra
(74) *Attorney, Agent, or Firm* — Canon U.S.A., Inc., IP Division

(57) ABSTRACT

An electrochromic device includes an electrochromic element 110 including an anode electrode 2a, a cathode electrode 2b, and an electrochromic layer 4, and drive means 120 connected to the electrochromic element. The electrochromic element 110 includes a plurality of anode terminals (A1, A2) electrically connected to the anode electrode 2a, and a plurality of cathode terminals (C1, C2) electrically connected to the cathode electrode 2b, and each of the anode terminals constitutes a terminal pair in combination with one of the cathode terminals. At least part of a first application period in which the drive means 120 applies a voltage to a first terminal pair that is one of the terminal pairs and at least part of a second application period in which the drive means (Continued)

120 applies a voltage to a second terminal pair that is another one of the terminal pairs are not overlapped with each other.

22 Claims, 7 Drawing Sheets

(51) Int. Cl.
*G02F 1/157* (2006.01)
*G09G 3/38* (2006.01)
*G02F 1/1523* (2019.01)
*G02F 1/1516* (2019.01)

(56) References Cited

FOREIGN PATENT DOCUMENTS

| | | |
|---|---|---|
| JP | 2008-545168 A | 12/2008 |
| JP | 2015-143826 A | 8/2015 |
| WO | 2017/168478 A1 | 10/2017 |

* cited by examiner

ELECTROCHROMIC DEVICE, OPTICAL FILTER USING SAME, LENS UNIT, IMAGE TAKING DEVICE, WINDOW MEMBER, AND DRIVING METHOD FOR ELECTROCHROMIC ELEMENT

CROSS-REFERENCE TO RELATED APPLICATIONS

This application is a Continuation of International Patent Application No. PCT/JP2017/039880, filed Nov. 6, 2017, which claims the benefit of Japanese Patent Application No. 2016-224386, filed Nov. 17, 2016, both of which are hereby incorporated by reference herein in their entirety.

TECHNICAL FIELD

The present invention relates to an electrochromic device, an optical filter using the electrochromic device, a lens unit, an image taking device, a window member, and a driving method for an electrochromic element.

BACKGROUND ART

A compound of the type that optical characteristics, such as an absorption wavelength and an absorbance of a substance, are changed by electrochemical redox reaction is called an electrochromic material ("electrochromic" is abbreviated to "EC" hereinafter in some cases). An EC element utilizing the EC material is applied to a display device, a variable reflectance mirror, a variable transmission window, etc.

One type of EC elements uses, for an EC layer, a solution containing an anodic EC material that is colorized by reduction, and a cathodic EC material that is colorized by oxidation. That type EC element is called a complementary EC element. When the complementary EC element is driven for a long time, there may occur a phenomenon, called segregation, that the anodic EC material and the cathodic EC material are separated inside the EC layer due to the influence of potential distribution within an electrode. If the segregation occurs, this may lead to a possibility that, in the case of decolorizing the EC layer into a colorless state, decolorization response of the EC material degrades and a longer time is needed for the decolorization.

To cope with the above-described segregation, Patent Literature 1 discloses a technique of adding a polymer matrix to an EC solution, and increasing viscosity of the EC solution. According to Patent Literature 1, the viscosity of the EC solution is increased to reduce movement of substances, such as an EC material contained in the EC solution and a redox substance participating in the redox reaction of the EC material, and to reduce the occurrence of the segregation.

Non Patent Literature 1 discloses an EC element in which a cathodic EC material containing a long and large anion species to reduce a density gradient generated by movement of the anion species in an EC layer, and to reduce the segregation.

CITATION LIST

Patent Literature

PTL 1 Japanese Patent Laid-Open No. 9-120088

Non Patent Literature

NPL 1 A. Michaelis et al., "Adv. Mater.", Vol. 13, (2001), p. 1825-1828

However, when the viscosity of the EC solution is increased as disclosed in Patent Literature 1, there is a possibility that a time required for colorization and a time required for decolorization are prolonged, and that response of the EC element is reduced. This is because the response of the EC element is affected by a diffusion rate of the EC material, which is contained in the EC solution, onto an electrode surface.

The length and size of the anion species contained in the EC layer depend on the length, size, concentration, etc. of the EC material contained in the EC layer. Therefore, the method disclosed in Non Patent Literature 1 reduces the degree of freedom in selection of the EC material used.

In consideration of the above-described problems, an object of the present invention is to reduce the segregation in the EC element.

SUMMARY OF INVENTION

An electrochromic device according to one aspect of the present invention includes an electrochromic element including an anode electrode, a cathode electrode, and an electrochromic layer positioned between the anode electrode and the cathode electrode, and drive means connected to the electrochromic element, wherein the electrochromic element includes a plurality of anode terminals electrically connected to the anode electrode and a plurality of cathode terminals electrically connected to the cathode electrode, each of the anode terminals constitutes a terminal pair in combination with one of the cathode terminals, and at least part of a first application period in which the drive means applies a voltage to a first terminal pair that is one of the terminal pairs and at least part of a second application period in which the drive means applies a voltage to a second terminal pair that is another one of the terminal pairs are not overlapped with each other.

Further features of the present invention will become apparent from the following description of exemplary embodiments with reference to the attached drawings.

DESCRIPTION OF EMBODIMENTS

Figure 1:
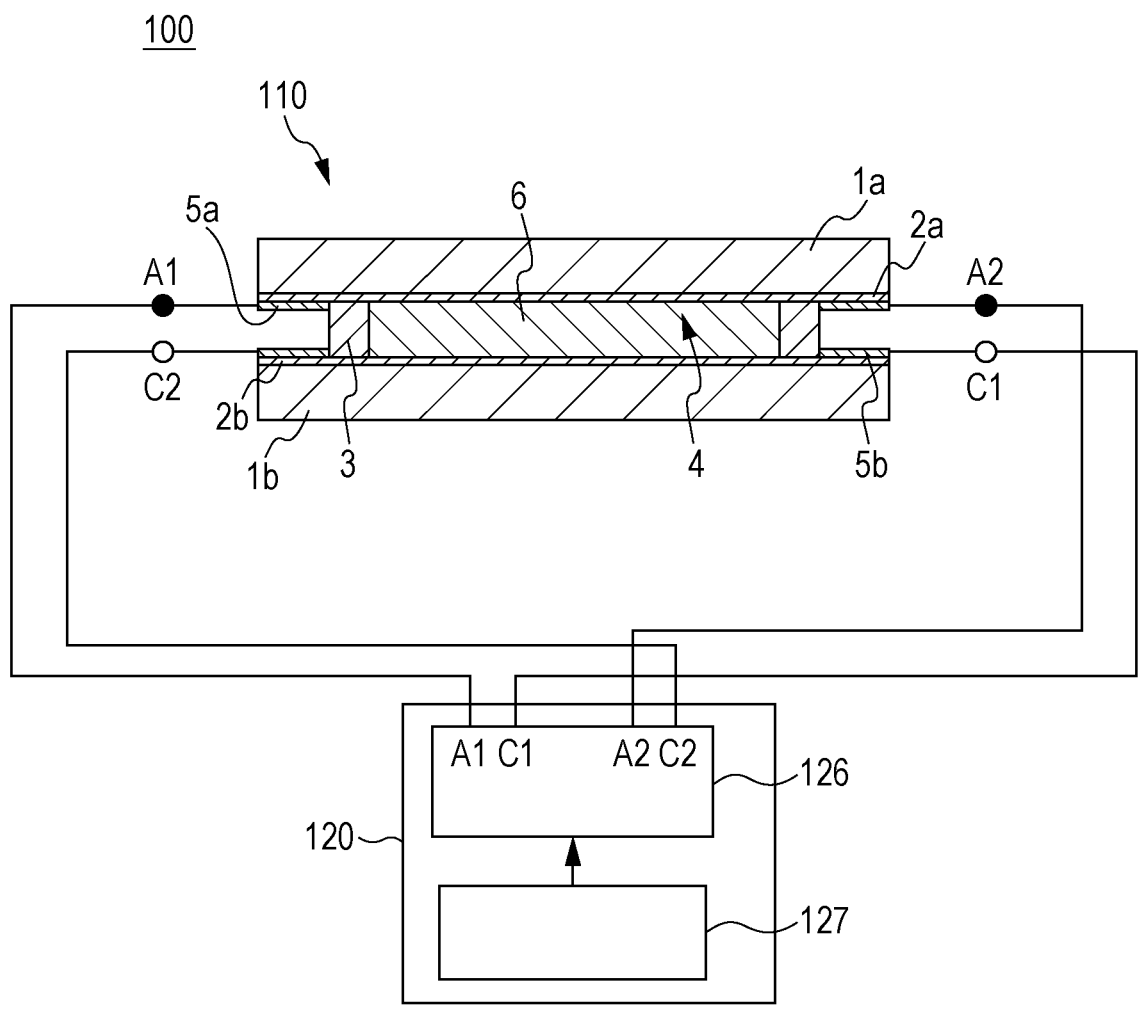
FIG. 1 is a schematic sectional view referenced to explain a configuration of an electrochromic device according to a first embodiment.

Details of an electrochromic element (hereinafter, "electrochromic" is abbreviated to "EC" in some cases) according to the present invention will be described below, by way of example, in connection with embodiments by referring to the drawings. It is to be noted that configurations, relative positional relations, and so on described in the embodiments are not purported to limit the scope of the present invention unless otherwise specified.

First Embodiment

A configuration of an electrochromic device (EC device) 100 according to a first embodiment is described with reference to FIG. 1. FIG. 1 is a schematic sectional view referenced to explain the configuration of the EC device 100.

The EC device 100 includes an electrochromic element 110 and drive means 120.

EC Element

The EC Element 110 includes a substrate 1a on which an anode electrode (first electrode) 2a is formed, a substrate 1b on which a cathode electrode (second electrode) 2b is formed, and an electrochromic layer (EC layer) 4 sandwiched between the first electrode 2a and the second electrode 2b. The EC element 110 further includes a plurality of low-resistance wirings 5a and 5b, a first anode terminal (anode electrode outlet) A1, a second anode terminal A2, a first cathode terminal (cathode electrode outlet) C1, and a second cathode terminal C2. Thus, it can also be said that the EC element 110 includes the plurality of anode terminals A1 and A2 electrically connected to the anode electrode 2a, and the plurality of cathode terminals C1 and C2 electrically connected to the cathode electrode 2b. In the following description, the first anode terminal A1 is called an "A1 terminal", the second anode terminal A2 is called an "A2 terminal", the first cathode terminal C1 is called a "C1 terminal", and the second cathode terminal C2 is called a "C2 terminal". The EC element 110 is required to include at least the electrodes 2a and 2b and the EC layer 4 disposed between the electrodes 2a and 2b, and it is not always required to include the substrates 1a and 1b.

The pair of the substrates 1a and 1b are disposed such that the first electrode 2a and the second electrode 2b are opposed to each other. The substrates 1a and 1b are bonded with a seal 3 interposed therebetween, the seal 3 containing gap control particles (not illustrated). An EC medium given by a solvent containing at least one type of EC material is filled between the first electrode 2a and the second electrode 2b, whereby the EC layer 4 is formed.

The EC layer 4 contains one or more types of anode EC materials and one or more types of cathode EC materials. Thus, it can also be said that the EC layer 4 is a solution layer containing an anodic EC material (anodic compound) and a cathodic EC material (cathodic compound). When a voltage is applied between the electrodes 2a and 2b, the EC materials cause electrochemical reaction. The EC layer 4 is not limited to the composition containing one or more types of anode EC materials and one or more types of cathode EC materials. The EC layer 4 may have a composition containing either one of one or more types of anode EC materials and one or more types of cathode EC materials, and not containing the other. In such a case, the EC layer 4 preferably contains, instead of the anodic EC material or the cathodic EC material that is not contained in the EC layer 4, an electrochemically active compound that causes redox reaction, but that is not colorized. Furthermore, preferably, the electrochemically active compound performs transfer of electrons at the electrode opposing to the electrode at which the EC material causes the reaction.

An organic EC material is preferably used as the EC material. In general, an organic EC material takes a neutral state under the condition that no voltage is applied, and it exhibits no absorptions in the visible light range. In such a colorless state, the organic EC material has a high optical transmittance. When a voltage is applied between both the electrodes, electrochemical reaction occurs in the organic EC material, and the organic EC material changes from the neutral state to an oxidized state (cation) or a reduced state (anion). In the state of a cation or an anion, the organic EC material exhibits absorption in the visible light range and is colorized.

Because the organic EC material has a low optical transmittance in the colored state, light passing through an effective light region 6 (hereinafter referred to simply as a "region 6") of the EC layer 4 is controlled by utilizing such a phenomenon. A material forming a transparent dication structure in an initial state and being colorized upon formation of a radical species by reduction of one electron, such as a viologen derivative, is also used. The wording "effective light region in the EC layer" in this Description stands for a region of the EC layer 4 where the light to be taken in by the EC element 110 passes.

The following discussion is made on an assumption that the transmittance of light through the EC element 110 is replaced with the absorbance of the EC element 110. The transmittance and the absorbance have relation of $-\text{LOG}(\text{transmittance})=(\text{absorbance})$, and the absorbance increases in units of about 0.3 each time the transmittance decreases to ½.

Details of the EC element 110 will be described below.

The pair of substrates 1a and 1b are preferably formed of transparent substrates. The word "transparent" used herein implies that a transmittance of the light taken in by the EC element 110 is not less than 50% and not more than 100%, preferably not less than 70% and not more than 100%, and more preferably not less than 90% and not more than 100%. The wording "light taken in by the EC element" in this Description implies light in a wavelength range to be used by the EC element. For example, when the EC element is used as an optical filter of an image taking device in the visible light range, the "light taken in by the EC element" implies light in the visible light range, and when the EC element is used as an optical filter of an image taking device in the infrared range, it implies light in the infrared range.

More specifically, the substrates 1a and 1b can be each made of, for example, optical glass, quartz glass, super white glass, soda-lime glass, borosilicate glass, no-alkali glass, or chemically strengthened glass. In particular, the no-alkali glass can be advantageously used from the viewpoint of transparency and durability. Furthermore, a transparent high-molecular-weight compound, or a colorless or colored transparent resin can also be used as the substrates 1a and 1b. The transparent resin is, for example, polyethylene terephthalate, polyethylene naphthalate, polynorbornene, polyamide, polysulfone, polyethersulfone, polyether ether ketone, polyphenylene sulfide, polycarbonate, polyimide, or polymethyl methacrylate.

Conductive films to be used as the first electrode 2a and the second electrode 2b are disposed on the substrates 1a and 1b. Though not illustrated, anti-reflection layers, index matching layers, etc. may be further disposed with intent to reduce reflection at surfaces of the substrates 1a and 1b, interfaces between the substrates 1a, 1b and the electrodes 2a, 2b, and interfaces between the electrodes 2a, 2b and the EC layer 4, and to increase the transmittance of the EC element.

Preferably, at least one of the first electrode 2a and the second electrode 2b is a transparent electrode. The word "transparent" used herein implies that the transmittance of the light taken in by the EC element 110 is not less than 50% and not more than 100%. With at least one of the first electrode 2a and the second electrode 2b being the transparent electrode, the light can be efficiently taken in from the outside of the EC element 110, thus making it possible to develop the interaction between the light and molecules of the EC material, and to reflect optical characteristics of the EC material on outgoing light.

The first electrode 2a and the second electrode 2b may be made of, for example, layers forming transparent conductive oxides on the substrates 1a and 1b, conductive layers containing, e.g., carbon nanotubes dispersed therein, or transparent electrodes formed by partially disposing metal lines on the transparent substrates 1a and 1b.

The transparent conductive oxide may be, for example, tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), or niobium-doped titanium oxide (TNO). Among those example, FTO or ITO is preferable.

A film thickness of each of the first electrode 2a and the second electrode 2b is preferably not less than 10 nm and not more than 10000 nm. In particular, when FTO or ITO formed to have a film thickness of not less than 10 nm and not more than 10000 nm is used as each of the first electrode 2a and the second electrode 2b, high transparency and chemical stability can be both obtained.

When each of the first electrode 2a and the second electrode 2b contains the transparent conductive oxide, each electrode 2a or 2b may be an electrode layer formed of one layer of the transparent conductive oxide, or a laminated electrode layer formed by laminating sublayers of the transparent conductive oxides. When the first electrode 2a and the second electrode 2b are each made of the laminated electrode layer, conductivity and transparency can be improved.

The seal 3 is preferably made of a material which is chemically stable, through which gases and liquids are hard to penetrate, and which does not impede the redox reaction of the EC material. For example, a thermosetting resin or an ultraviolet curable resin can be used as the seal 3, but a suitable material is selected as required depending on a method of filling the above-described electrochromic medium, namely depending on the element process. The seal 3 may be mixed with cell-gap control particles so as to have the function as a spacer for specifying the spacing between the pair of substrates 1a and 1b.

When the seal 3 does not have the function as the spacer, a dedicated spacer may be separately disposed to hold the distance between the electrodes. The spacer used in the above case may be made of any one of inorganic materials such as silica beads or glass fibers, and organic materials such as polyimide, polytetrafluoroethylene, polydivinylbenzene, fluorine rubber, and epoxy resin.

The EC layer 4 includes the EC medium containing at least one type of EC material and a solvent. A benefit agent, such as a support electrolyte or a thickener, may be further added to the EC medium. As methods for filling the EC medium, there are a method of forming a pair of holes in the substrates 1a and 1b, and filling the EC medium through the holes, and a method of vacuum-injecting the EC medium through a filling hole in a side surface of the EC element 110, the filling hole being formed by a seal pattern. As an alternative method, the EC medium may be filled in a vacuum at the same time as bonding the pair of substrates 1a and 1b. Suitable one of the above-mentioned methods can be used optionally.

The term "EC material" stands for a compound that is colorized by redox reaction. The EC material colorized by oxidation reaction is called an anodic EC material, and the EC material colorized by reduction reaction is called a cathodic EC material.

A compound of which transmittance for visible light is changed by redox can be suitably used as the EC material. The EC material used in this embodiment is preferably an organic compound containing a low molecular weight organic compound and a high molecular weight organic compound. In particular, a low molecular weight organic compound having the molecular weight of 2000 or below and changing from a colorless substance to a colored substance by oxidation reaction or reduction reaction at the electrode is used preferably.

An organic compound, such as a thiophene compound, a phenazine compound, or a bipyridinium salt compound, can be suitably used as the EC material. A practical example of the high molecular weight organic compound capable of being used as the EC material is a high molecular weight compound containing a pyridinium salt, such as a viologen-based high molecular weight compound.

Although the complementary EC element containing both the anodic EC material and the cathodic EC material as the EC materials is used in this embodiment, the present invention is not limited to that case, and the EC material is just required to contain at least one of those EC materials. The anodic EC material or the cathodic EC material contained in the EC layer 4 may be one type or plural types.

Examples of the anodic EC material include amines having aromatic rings (e.g., phenazine derivatives and triarylamine derivatives), thiophene derivatives, pyrrole derivatives, thiazine derivatives, triarylmethane derivatives, bisphenylmethane derivatives, xanthene derivatives, fluoran derivatives, spiropyran derivatives, and so on. Among the above examples, low molecular weight thiophene derivatives (e.g., monothiophene derivatives, oligothiophene derivatives, and thienoacene derivatives), or low molecular weight amines having aromatic rings (e.g., phenazine derivatives and triarylamine derivatives) are used preferably. In a neutral state, those anodic EC materials have absorption peaks in an ultraviolet range, exhibit no absorptions in the visible light range, and take a colorless state in which the transmittance in the visible light range is high.

Examples of the cathodic EC material include pyridine-based compounds, such as viologen, and quinone compounds.

Although the solvent is not limited to particular one insofar as it dissolves the electrochromic material and the benefit material such as the support electrolyte, a solvent having a large polarity can be used preferably. Practical examples of the solvent include water and organic polar solvents such as methanol, ethanol, propylene carbonate, ethylene carbonate, dimethyl sulfoxide, dimethoxy ethane, γ-butyrolactone, γ-valerolactone, sulfolane, dimethylformamide, dimethoxyethane, tetrahydrofuran, acetonitrile, propyonitrile, benzonitrile, dimethylacetamide, methylpyrrolidinone, dioxolane, and so on.

Although the support electrolyte is not limited to particular one insofar as it is an ion dissociative salt and exhibits good solubility with respect to the solvent, an electrolyte having an electron-donating ability can be used preferably. The support electrolyte is, for example, any one of various inorganic ionic salts such as alkali metal salts, alkali earth metal salts, quaternary ammonium salts, cyclic quarternary ammonium salts, and so on. Practical examples of the support electrolyte include alkali metal salts of Li, Na, and K, such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$, and $KCl$, quaternary ammonium salts and cyclic quarternary ammonium salts such as $(CH_3)4NBF_4$, $(C_2H_5)4NBF_4$, $(n-C_4H_9)4NBF_4$, $(n-C_4H_9)4NPF_6$, $(C_2H_5)4NBr$, $(C_2H_5)4NClO_4$, and $(n-C_4H_9)4NClO_4$, etc.

For example, at least one selected from among cyanoethyl polyvinyl alcohol, cyanoethyl pullulan, and cyanoethyl cellulose can be suitably used as the thickener to increase the viscosity of the EC medium. Those materials are available from Shin-Etsu Chemical Co., Ltd. in the product names of CR-V (cyanoethyl polyvinyl alcohol: softening temperature of 20 to 40° C., dielectric constant of 18.9), CR-S (cyanoethyl pullulan: softening temperature 9 of 0 to 100° C., dielectric constant of 18.9), CR-C (cyanoethyl cellulose: softening temperature of 200° C. or higher, dielectric constant of 16), and CR-M (mixture of cyanoethyl pullulan and cyanoethyl polyvinyl alcohol: softening temperature of 40 to 70° C., dielectric constant of 18.9). Those thickeners are additives capable of ensuring high viscosity and high ion conductivity over a wide temperature range.

The low-resistance wirings 5a and 5b have resistances lower than those of the first electrode 2a and the second electrode 2b, and they are formed to reduce an in-plane distribution of voltages supplied to the first and second electrodes 2a and 2b from the A1, A2, C1, and C2 terminals that are power feed terminals. A sheet resistance of each of the low-resistance wirings 5a and 5b is preferably lower than the resistance of each of the first and second electrodes 2a and 2b. In more detail, the sheet resistance of each of the low-resistance wirings 5a and 5b is preferably less than 1/100 and more preferably less than 1/500 of the resistance of each of the first and second electrodes 2a and 2b. A thin-film silver wiring formed by vacuum deposition, or a thick-film silver wiring formed by screen printing or ink jet coating, for example, can be suitably used as the low-resistance wirings 5a and 5b.

Figure 2A:
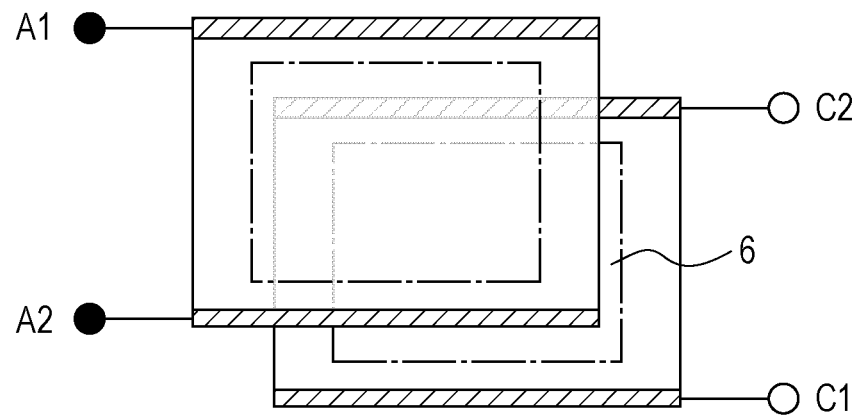
FIG. 2A is an explanatory view referenced to explain a layout of terminals and low-resistance wirings of an electrochromic element according to the first embodiment.

The plurality of low-resistance wirings 5a are disposed in the first electrode 2a, and the A1 terminal and the A2 terminal are connected to opposing end portions of the first electrode 2a through the different low-resistance wirings 5a. The plurality of low-resistance wirings 5b are disposed in the second electrode 2b, and the C1 terminal and the C2 terminal are connected to opposing end portions of the second electrode 2b through the different low-resistance wirings 5b. A layout of the low-resistance wirings 5a and 5b, the A1 terminal, the A2 terminal, the C1 terminal, and the C2 terminal in the EC element 110 will be described below with reference to FIG. 2A. FIG. 2A is a schematic view illustrating an example of the layout of the low-resistance wirings 5a and 5b, the A1 terminal, the A2 terminal, the C1 terminal, and the C2 terminal in the EC element 110.

As illustrated in FIG. 2A, the EC element 110 in this embodiment has a substantially rectangular shape. The shape of the EC element 110 is not limited to such an example, and it is preferably changed depending on use of the EC element. For instance, when the EC element 110 is used as an ND filter in an image taking device, it is preferable to use an EC element having a rectangular shape in match with an image taking element.

In the first electrode 2a, the low-resistance wirings 5a are each disposed along one of two long sides of the first electrode 2a. One of the two low-resistance wirings 5a is connected to the A1 terminal, while the other low-resistance wiring 5a is connected to the A2 terminal. Similarly, in the second electrode 2b, the low-resistance wirings 5b are each disposed along one of two long sides of the second electrode 2b. One of the two low-resistance wirings 5b is connected to the C1 terminal, while the other low-resistance wiring 5b is connected to the C2 terminal.

The low-resistance wirings 5a and 5b are disposed to be not overlapped with the region 6 of the EC layer 4. Furthermore, the low-resistance wirings 5a and 5b are preferably disposed along the long sides of the first electrode 2a and the second electrode 2b to reduce potential drops in a long-side direction in respective planes of the first electrode 2a and the second electrode 2b. Segregation caused by the potential distribution can be reduced by reducing the potential drops in the long-side direction of the first electrode 2a and the second electrode 2b. The potential drops in the long-side direction in the respective planes of the first electrode 2a and the second electrode 2b are preferably about 10 mV.

The A1 terminal and the C1 terminal are positioned opposing to each other with the region 6 interposed therebetween. The A2 terminal and the C2 terminal are positioned opposing to each other with the region 6 interposed therebetween. In this Description, an anode terminal and a cathode terminal connected to different electrodes and positioned opposing to each other with the region 6 interposed therebetween are called a terminal pair. In the following description, the A1 terminal and the C1 terminal are called a first terminal pair A1-C1, and the A2 terminal and the C2 terminal are called a second terminal pair A2-C2 in some cases.

The drive means 120 applies drive pulses to the first terminal pair A1-C1 and the second terminal pair A2-C2, thereby energizing and driving the EC element 110. In the configuration of applying a voltage (drive voltage) between the terminal pair opposing to each other with the region 6 interposed therebetween, when the drive voltage is applied between the terminal pair to change or maintain the absorbance of the EC element 110, a current flows through the EC layer 4. Therefore, concentration unevenness in the EC layer 4 can be reduced.

Drive Means

The drive means 120 is control means that is connected to the first electrode 2a and the second electrode 2b through the A1, A2, C1, and C2 terminals, and that drives the EC element 110. The drive means 120 applies the drive voltages for driving the EC element 110 to the electrodes 2a and 2b through the A1, A2, C1, and C2 terminals and the low-resistance wirings 5a and 5b. On that occasion, a drive pulse including an application period in which the drive voltage is applied and a pause period in which the drive voltage is not applied is applied to each of the electrodes 2a and 2b of the EC element. The drive means 120 preferably includes a drive power supply 126 outputting the drive voltages, and a switch circuit serving as switching means 127 that switches over application of a drive pulse $P_1$ to the first terminal pair A1-C1 and application of a drive pulse $P_2$ to the second terminal pair A2-C2. The drive means 120 may further include, though not illustrated, peripheral devices such as a power supply and a regulator, a circuit mechanism for measuring a current or charges generated by the electrochemical reaction, etc.

The A1 terminal, the A2 terminal, the C1 terminal, and the C2 terminal are connected to the drive power supply 126 in the drive means 120. By alternately applying the drive pulses between the first terminal pair A1-C1 and between the second terminal pair A2-C2, the drive means 120 drives the EC device 100 and controls the absorbance of the EC layer 4. Moreover, the drive means 120 modulates pulse widths of both the drive pulse $P_1$ applied to the first terminal pair A1-C1 and the drive pulse $P_2$ applied to the second terminal pair A2-C2, thereby controlling a duty ratio. In the following description, the first terminal pair A1-C1 is called a channel 1, and the second terminal pair A2-C2 is called a channel 2 in some cases.

The drive means 120 is not always required to be an analog circuit, and a computer, such as a CPU, having at least the function of the switching means 127 can also be used. In the latter case, the drive means 120 controls a duty ratio between the drive pulses applied to the terminal pairs, timings of the application of the drive pulses, the magnitude of drive voltages, etc. Alternatively, a computer, such as a CPU, for controlling a device in which the EC element 110 is built in may have the function of the drive means 120.

Driving of EC Element

Driving of the EC element 110 using the drive means 120 according to this embodiment will be described below. When changing the absorbance of the EC element 110 to a target absorbance or maintaining the target absorbance, the drive means 120 drives the EC element 110 by alternately applying the drive pulses to the channel 1 and the channel 2.

Figure 6A:
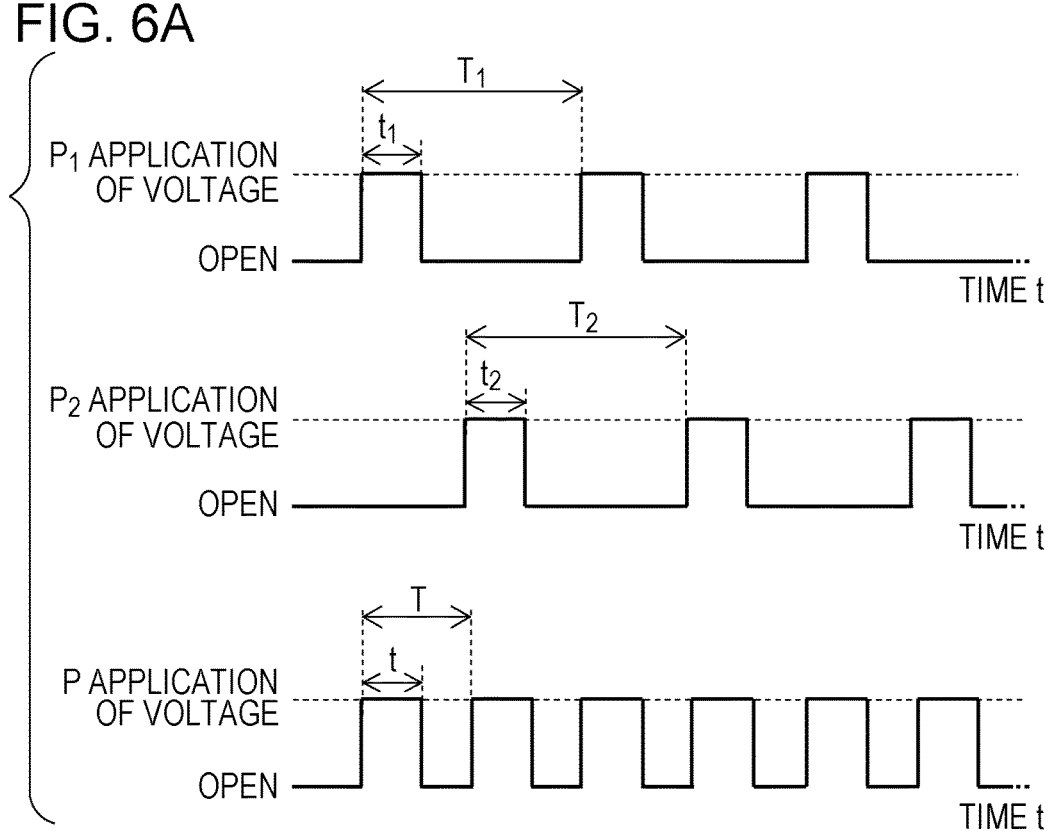
FIG. 6A illustrates an example of drive pulses applied to the electrochromic element in the first embodiment.

As illustrated in FIG. 6A, for example, the drive means 120 performs control such that a first drive pulse $P_1$ is applied to the channel 1 and a second drive pulse $P_2$ is applied to the channel 2. In that case, looking at the entirety of the EC element 110, it can be said that a drive pulse P resulting from summing the first drive pulse $P_1$ and the second drive pulse $P_2$ is applied. Therefore, a duty ratio of the drive pulse P applied to the EC element 110 can be adjusted and the absorbance of the EC element 110 can be controlled by adjusting duty ratios of the drive pulses P1 and P2.

The drive pulse includes an application time t in which a drive voltage $E_{on}$ causing the redox reaction of the EC material is applied, and a pause period in which the drive voltage $E_{on}$ is not applied. In that case, a voltage waveform having a drive frequency f=1/T, a duty ratio D=t/T, and a peak value of $E_{ON}$ is applied to the EC element 110. Here, f denotes the drive frequency of the drive pulse for driving the EC element 110, T denotes one period, and t denotes a pulse width (application period). Assuming that the sum of the application time and the pause period is one period, the duty ratio is given by a ratio of the application period to one period.

Relation between the drive frequency f of the EC element 110 and the absorbance of the EC element 110 will be described below.

Figure 4A:
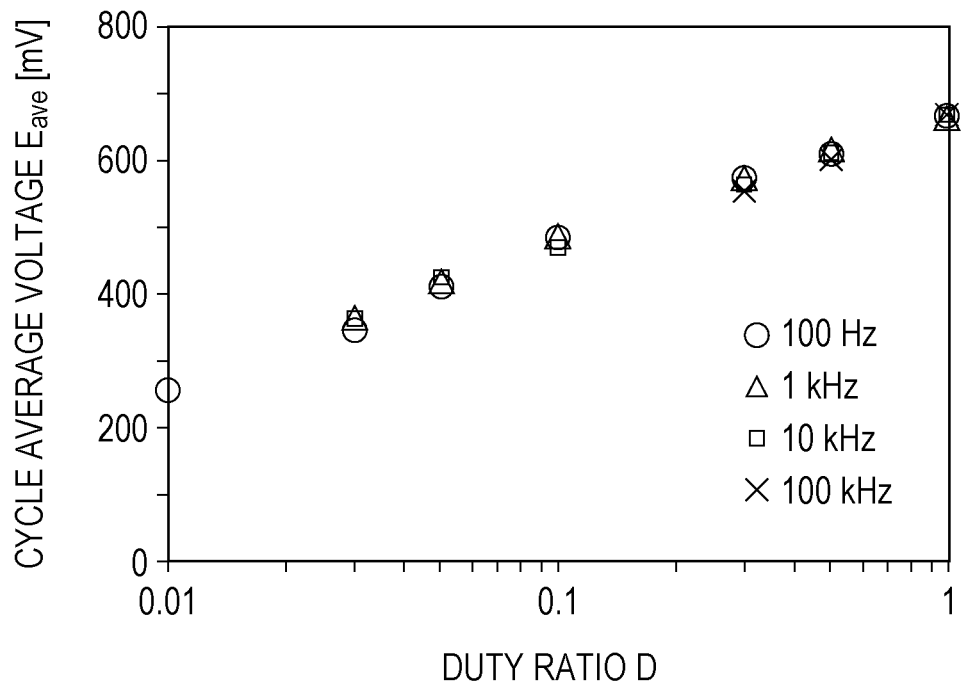
FIG. 4A is a graph referenced to explain relation between a cycle average voltage and a duty ratio with respect to a drive frequency.
Figure 4B:
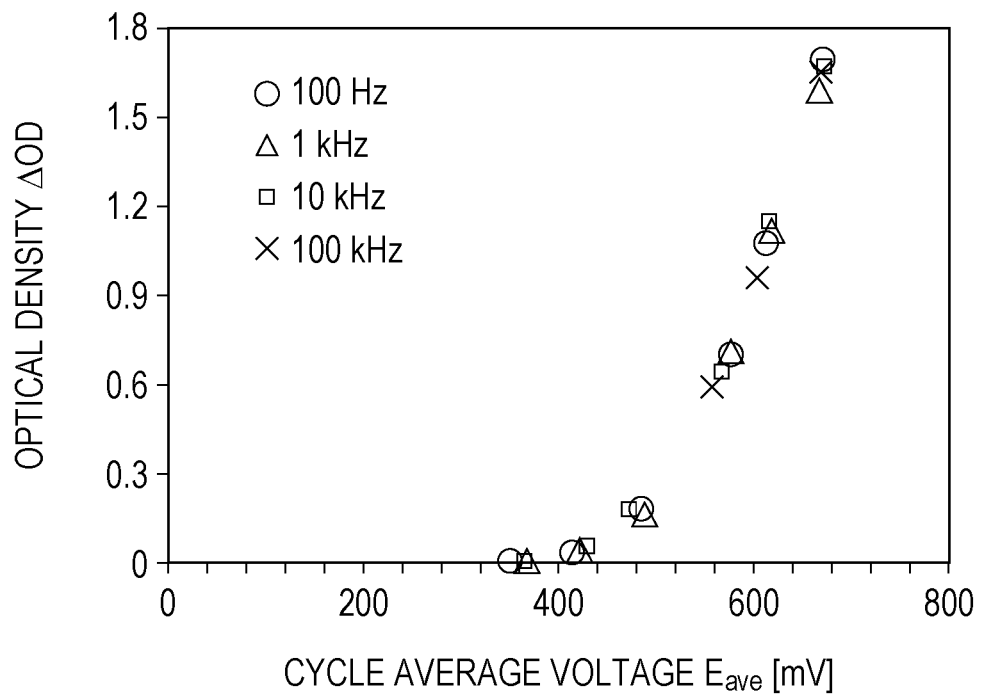
FIG. 4B is a graph referenced to explain relation between an optical density of the electrochromic element and a cycle average voltage with respect to a drive frequency.

FIG. 4A is a graph depicting relation between a cycle average voltage and the duty ratio when the EC element is driven while the drive frequency f is stepwise changed from 100 Hz to 100 kHz. FIG. 4B is a graph depicting relation between an optical density of the electrochromic element 110 and the cycle average voltage while the drive frequency f is stepwise changed from 100 Hz to 100 kHz. The optical density is logarithmic expression of the optical absorbance.

As seen from FIG. 4A, the cycle average voltage is uniquely determined depending on the duty ratio regardless of the drive frequency f. Furthermore, as seen from FIG. 4B, the optical density is uniquely determined depending on the cycle average voltage regardless of the drive frequency f. Thus, it can be said that the optical density is uniquely determined depending on the duty ratio regardless of the drive frequency f. Stated in another way, it can be said that the absorbance of the EC element 110 is uniquely determined depending on the duty ratio regardless of the drive frequency f.

If the drive frequency f is not higher than 100 Hz, this is unsatisfactory because a transmittance variation width within one cycle increases. If the drive frequency f is not lower than 100 kHz, the voltage is hard to follow due to a capacitance component of the EC element 110. Therefore, the drive frequency f is preferably in the range of larger than 100 Hz and lower than 100 kHz. When the EC element is used as a variable ND filter in a motion picture taking device (image taking device), the drive frequency f is more preferably in the range of higher than 10 kHz and lower than 100 kHz.

An example of the drive pulses, illustrated in FIG. 6A, applied to the channel 1 and the channel 2 will be described below. The drive pulse $P_1$ applied to the channel 1 and the drive pulse $P_2$ applied to the channel 2 are drive pulses having the same shape, but phases of those drive pulses are shifted by $\pi$. In other words, two drive pulses having equal periods T1 and T2 and equal duty ratios D1 (=t1/T1) and D2 (=t2/T2) are applied such that drive voltage application periods t1 and t2 of the drive pulses are not overlapped with each other. Consequently, the drive pulse P resulting from summing the two drive pulses $P_1$ and $P_2$ and having the period T and the duty ratio t/T is applied to the EC element 110.

During a period in which a drive voltage $E_{on}$ is applied to one terminal pair, the other terminal pair is in an open state. Thus, while the drive voltage $E_{on}$ is applied to one terminal pair, the potential of the other terminal pair is at an open potential $E_{open}$. Furthermore, all the terminals are at the open potential $E_{open}$ during the pause periods of the drive pulses.

Figure 6B:
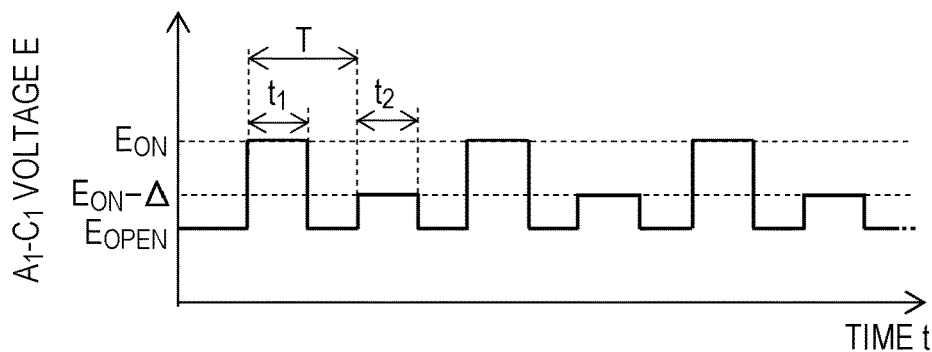
FIG. 6B illustrates an example of a drive pulse applied to the electrochromic element in the first embodiment.
Figure 6C:
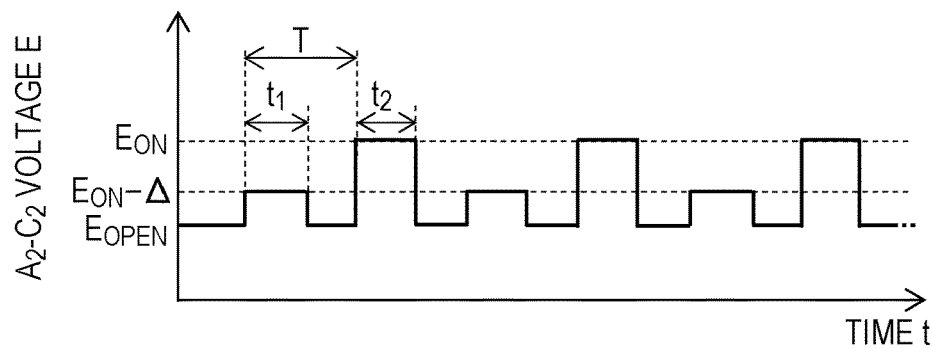
FIG. 6C illustrates an example of a drive pulse applied to the electrochromic element in the first embodiment.

FIGS. 6B and 6C depict voltages between the terminal pairs when the drive pulses P1 and P2 are applied as described above. When the channel 1 is selected and the drive voltage $E_{on}$ is applied, the A2 terminal is at the open potential. However, a voltage at the A2 terminal is $E_{on}-\Delta/2$ on an assumption that a voltage drop between the A1 terminal and the A2 terminal is denoted by $\Delta/2$. Similarly, the C2 terminal is at the open potential, but a voltage at the C2 terminal is $E_{on}+\Delta/2$ because a voltage drop between the C1 terminal and the C2 terminal is $\Delta/2$. Thus, in a first application period $t_1$ in which the drive voltage $E_{on}$ is applied to the channel 1, a voltage of the channel 2 is $E_{on}-\Delta$.

Similarly, in a second application period $t_2$ in which the drive voltage $E_{on}$ is applied to the channel 2, a voltage of the channel 1 is $E_{on}$-Δ.

In this embodiment, as described above, when changing or maintaining the absorbance, the drive means 120 performs control such that the first application period $t_1$ and the second application period $t_2$ are not overlapped with each other. To that end, the drive means 120 includes the switching means 127 that switches over the application of the drive voltage to the channel 1 and the application of the drive voltage to the channel 2.

The expression "the first application period and the second application period are not overlapped with each other" in this Description is defined as including the case in which the first application period $t_1$ and the second application period $t_2$ are temporally away from each other. Furthermore, the expression "the first application period and the second application period are not overlapped with each other" in this Description is defined as including the case in which the end of the first application period $t_1$ is coincident with the start of the second application period $t_2$, and the case in which the end of the second application period $t_2$ is coincident with the start of the first application period $t_1$.

Without being limited to the above-mentioned example, the drive means 120 may perform control such that at least part of the first application period $t_1$ in which the drive voltage $V_{on}$ is applied to the channel 1 and at least part of the second application period $t_2$ in which the drive voltage $V_{on}$ is applied to the channel 2 are not overlapped with each other. In such a case, there is an overlap period in which the part of the first application period $t_1$ overlaps with the part of the second application period $t_2$. If the overlap period is long, a current flows between the A1 terminal and the C2 terminal and between the A2 terminal and the C1 terminal, while a current is less apt to flow through the region 6. This leads to a possibility that concentration unevenness may occur. Therefore, the overlap period is preferably as short as not causing the concentration unevenness and more preferably not shorter than 1 ms, which is a voltage rising time, but not longer than 1000 ms. More preferably, the first application period $t_1$ and the second application period $t_2$ are not overlapped with each other.

The related-art EC element includes one terminal pair, and a drive pulse is applied to the one terminal pair. This can be regarded as applying the drive pulse only between the first terminal pair A1-C1, for example, in the EC device 100 according to this embodiment. In such a case, segregation (color separation) may occur; namely, an anode material may be strongly colorized near an anode terminal of the terminal pair, and a cathode material may be strongly colorized near a cathode terminal. This is presumably attributable to the fact that a potential distribution generates on the electrode even with the provision of the low-resistance wiring. The potential distribution on the electrode increases particularly in a direction departing further away from the low-resistance wiring connected to the terminal. At the anode electrode, for example, a potential becomes lower at a position departing further away from the low-resistance wiring connected to the anode terminal.

In this embodiment, the C1 terminal and the C2 terminal are arranged at the positions opposing to the A1 terminal and the A2 terminal with the region 6 interposed therebetween, respectively, and the drive pulses are applied such that at least part of the first application period $t_1$ and at least part of the second application period $t_2$ are not overlapped with each other. With those features, in the first electrode 2a, a state in which a potential at the side including the A1 terminal is higher and a state in which a potential at the side including the A2 terminal is higher generate alternately. It can be thought that the above-mentioned phenomenon also similarly occurs in the second electrode 2b. As a result, the segregation caused by the potential distribution can be reduced. Stated in another way, in the EC device 100 according to this embodiment, the channel 2 is arranged, in addition to the channel 1, at such a position as cancelling the segregation generated due to the potential distribution generated in the channel 1. The generation of the segregation is reduced by switching over the application of the drive pulse to the channel 1 and the application of the drive pulse to the channel 2.

In this embodiment, the EC element 110 has a rectangular shape, and two terminal pairs are disposed. However, the configuration of the EC element 110 is not limited to the above-described example, and the shape of the EC element 110 may be modified as appropriate to a circle, an ellipse, a polygon, etc. Furthermore, the number of terminal pairs in the EC element 110 is not limited to two, and the EC element 110 may include three or more terminal pairs. When the EC element 110 includes the number N (N is an integer of 2 or more) of terminal pairs, for example, voltages are applied to individual terminals such that at least parts of the application periods in which drive voltages are applied to the terminals are not overlapped with one another. In that case, although shapes of drive pulses applied to the number N of terminal pairs may be the same or different, it is preferable to apply drive pulses having the same shape and different phases shifted from one another by integer multiple of $2\pi/N$ radian.

Figure 2B:
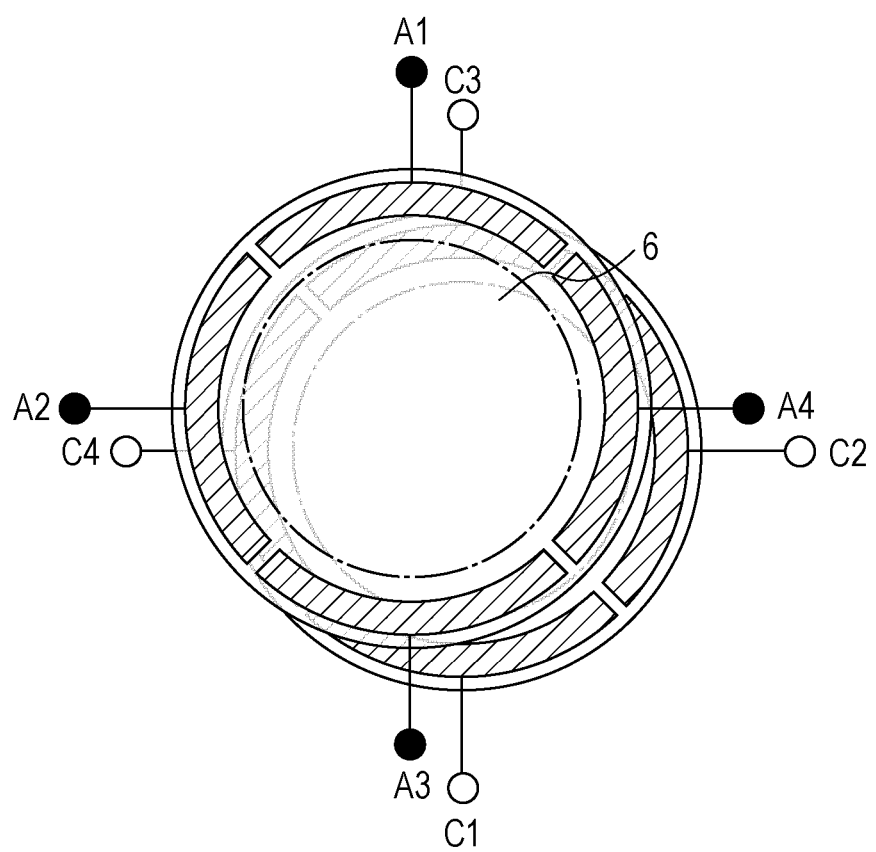
FIG. 2B is an explanatory view referenced to explain the layout of the terminals and the low-resistance wirings of the electrochromic element according to the first embodiment.

An example of the EC element 110 including a plurality of terminal pairs will be described below with reference to FIG. 2B. The EC element 110 illustrated in FIG. 2B has a substantially circular shape.

When the EC element 110 has a substantially circular shape, the number N of low-resistance wirings 5a and the number N of low-resistance wirings 5b are preferably disposed along circular outer peripheries of the first electrode 2a and the second electrode 2b, respectively, each of which also has a substantially circuit shape. N is an integer of 2 or more and is selected in consideration of the size of the EC element 110, a ratio of the resistance of the EC medium to the resistance of the electrodes 2a and 2b, etc. When four low-resistance wirings 5a and four low-resistance wiring 5b are disposed as illustrated in FIG. 2B, four anode terminals A1 to A4 are connected to one electrode 2a, and four cathode terminals C1 to C4 are connected to the other electrode 2b. In addition, the anode terminals A1 to A4 and the cathode terminals C1 to C4 are arranged at positions opposing to each other respectively with the effective light region interposed therebetween.

In the above case, for example, drive pulses are successively applied from the drive power supply 126 to four terminal pairs A1-C1, A2-C2, A3-C3, and A4-C4 in the mentioned order. In other words, the drive means 120 applies the drive pulses to the four terminal pairs A1-C1, A2-C2, A3-C3, and A4-C4 such that periods in which the drive voltages are applied are not overlapped with one another. As a result, the generation of the segregation due to the voltage distribution in the EC element 110 can be reduced to a lower level than in the related art.

With the EC device according to this embodiment, the segregation in the EC element can be reduced. Moreover, with the EC device according to this embodiment, the segregation can be reduced without increasing the viscosity of the EC solution, namely without inviting the cause of reducing the response of the EC element.

Second Embodiment

An EC device according to a second embodiment will be described below. The second embodiment is different from the first embodiment in a method of applying drive pulses when the EC element 110 is driven. The other configuration is similar to that in the first embodiment, and detailed description of the other configuration is omitted.

In the first embodiment, when changing or maintaining the absorbance, the drive voltages are alternately applied to the first terminal pair A1-C1 (channel 1) and the second terminal pair A2-C2 (channel 2) as illustrated in FIG. 6A. Thus, the drive means 120 performs control such that the first application period $t_1$ and the second application period $t_2$ appear alternately.

Figure 3A:
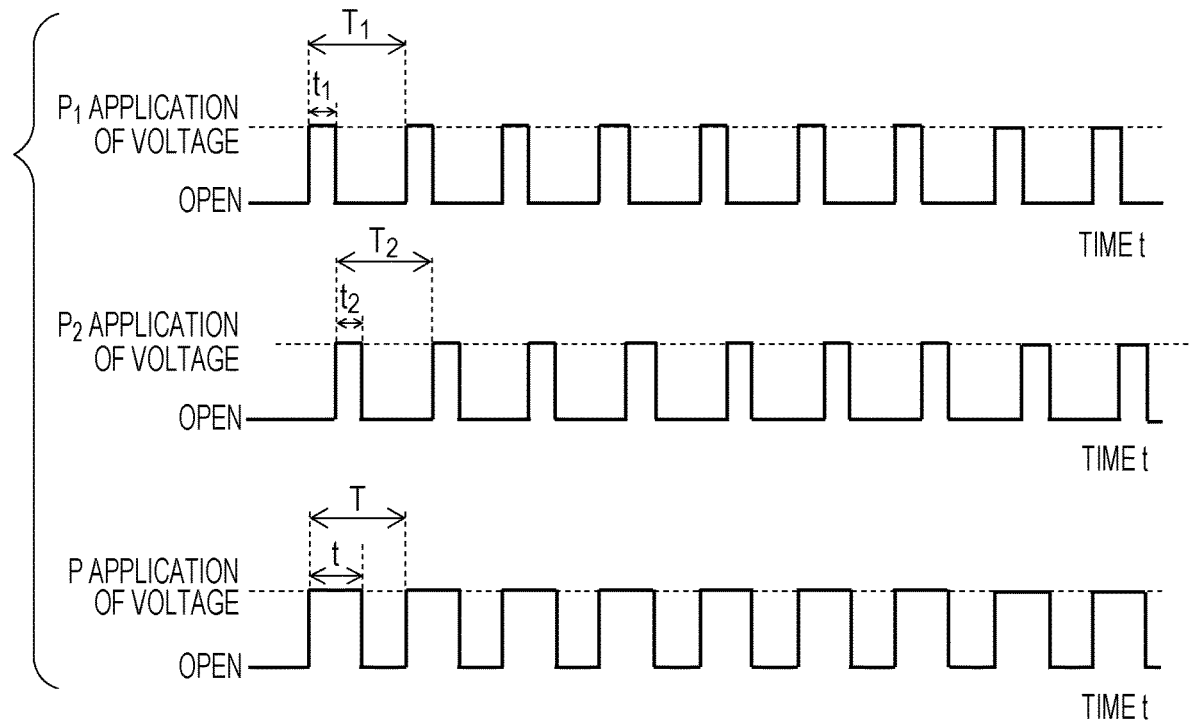
FIG. 3A illustrates an example of drive pulses applied to the electrochromic element in a second embodiment.

In contrast, in this embodiment, a step of applying a train of the number n of voltages pulses to the channel 1 and a step of applying a train of the number n of voltages pulses to the channel 2 are performed in an alternate relation as illustrated in FIG. 3A. Thus, in this embodiment, multiple applications of the drive voltage to the channel 1 and multiple applications of the drive voltage to the channel 2 are performed in an alternate relation. Here, n is an integer of 2 or more. The pulse number of the drive pulse train applied to the channel 1 and the pulse number of the drive pulse train applied to the channel 2 may be the same or different from each other. A period $T_1$ of a first drive pulse $P_1$ and a period $T_2$ of a second drive pulse $P_2$ are the same. The drive means 120 in this embodiment performs control such that the drive voltages are not applied to the two channels at the same time.

Figure 3B:
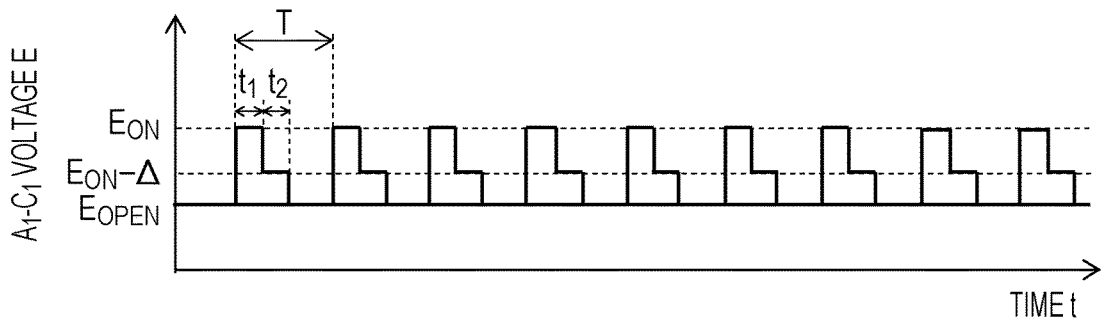
FIG. 3B illustrates an example of a drive pulse applied to the electrochromic element in the second embodiment.
Figure 3C:
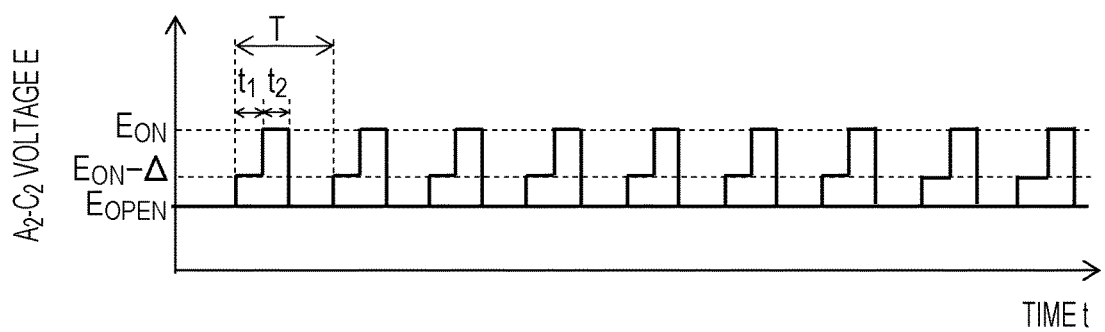
FIG. 3C illustrates an example of a drive pulse applied to the electrochromic element in the second embodiment.

As also described in the first embodiment, during a period in which the drive voltage $E_{on}$ is selectively applied to the channel 1, the terminals in the other channel are at the open potential. Furthermore, all the terminals are at the open potential $E_{open}$ during the pause periods of the voltage pulses. Accordingly, when the drive voltage $E_{on}$ is selectively applied to the channel 1, for example, the A2 and C2 terminals at the open potential have voltages $E_{on}-\Delta/2$ and $E_{on}+\Delta/2$, respectively. Thus, a voltage of the channel 2 at that time is $E_{on}-\Delta$. Therefore, the voltages of the channels 1 and 2 are given as depicted in FIGS. 3B and 3C, and a channel switching frequency $f_{ch}$ is given by $f_{ch}=1/nT$.

The drive frequency f of the EC element 110 and the channel switching frequency $f_{ch}$ are described here. During the channel switching period, as described above, the absorbance of the EC element 110 is uniquely determined depending on the duty ratio of the drive pulse. The drive frequency f is preferably in the range of larger than 100 Hz and smaller than 100 kHz. When the EC element is used as a variable ND filter in a motion picture taking device (image taking device), the drive frequency f is more preferably in the range of larger than 10 kHz and smaller than 100 kHz.

If the channel switching frequency $f_{ch}$ is not higher than 100 Hz, the transmittance variation width within one cycle increases. Accordingly, the channel switching frequency $f_{ch}$ is preferably in a range of 100 Hz$<f_{ch}\leq$f. The drive-pulse applying method in the first embodiment is to apply the drive pulses having the channel switching frequency $f_{ch}$ equal to the drive frequency f (i.e., $f_{ch}$=f).

Figure 7A:
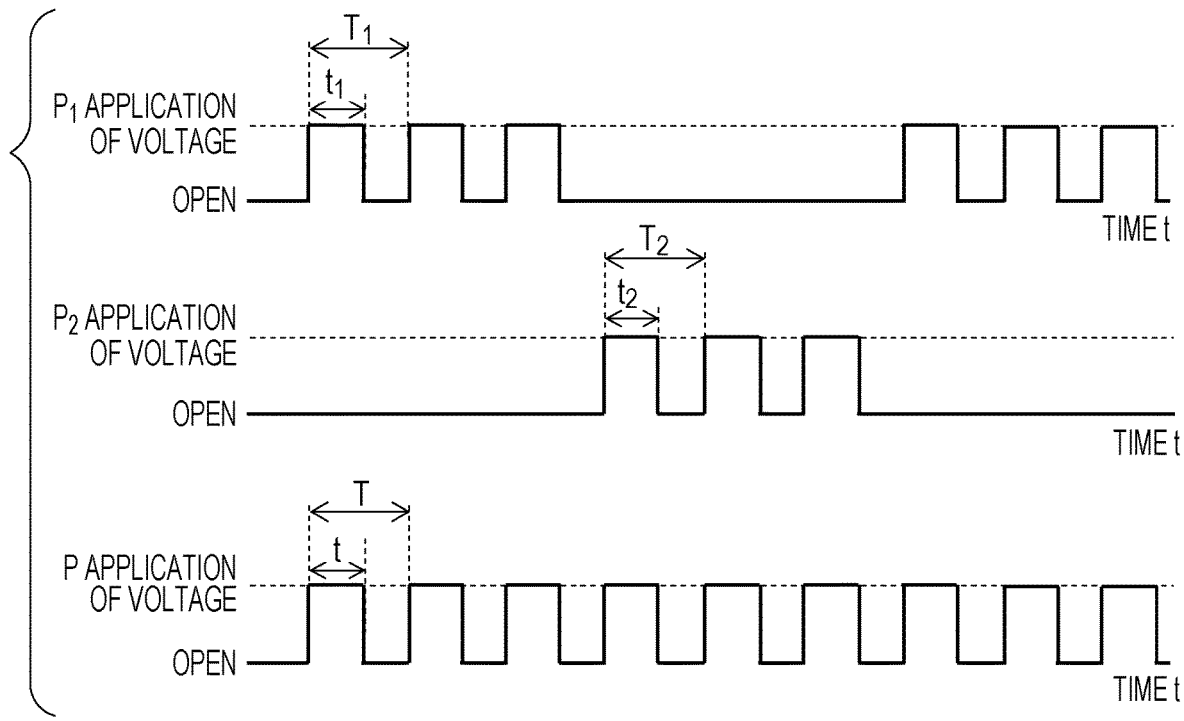
FIG. 7A illustrates another example of drive pulses applied to the electrochromic element in the second embodiment.
Figure 7B:
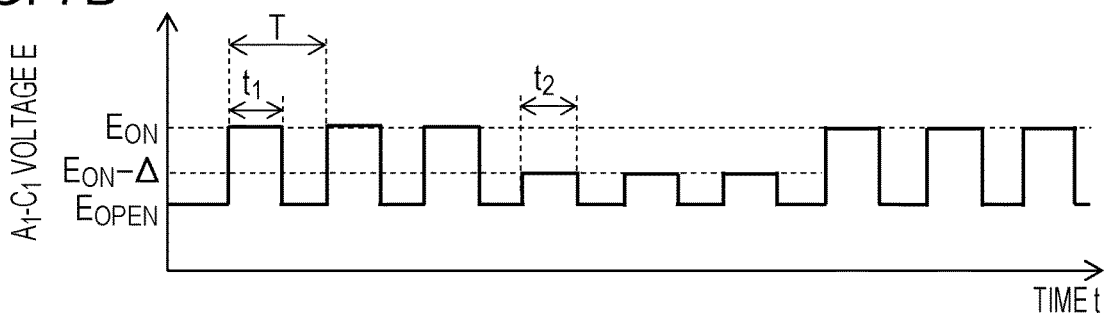
FIG. 7B illustrates another example of a drive pulse applied to the electrochromic element in the second embodiment.
Figure 7C:
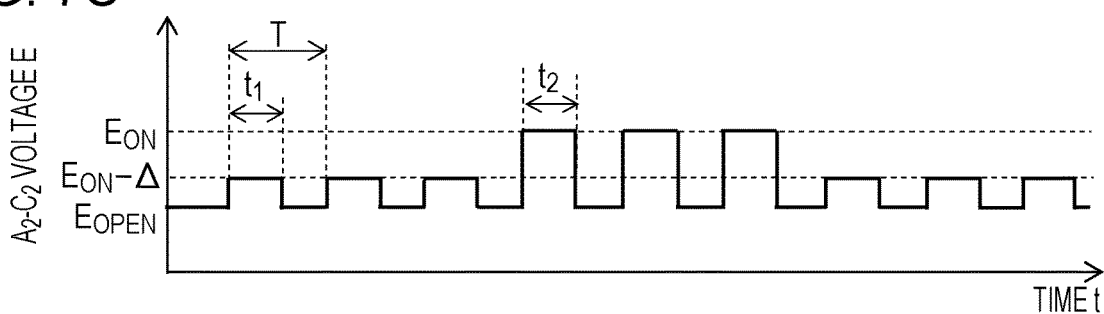
FIG. 7C illustrates another example of a drive pulse applied to the electrochromic element in the second embodiment.

The method of applying the drive pulses to the EC element is not limited to the above-described one. In an alternative example, the drive means 120 may perform control to apply the drive pulses such that the first application period $t_1$ and the second application period $t_2$ are each successively repeated as illustrated in FIGS. 7A, 7B and 7C. FIG. 7A illustrates waveforms of drive pulses $P_1$ and $P_2$ applied to the two channels, and a shape of a drive pulse P applied to the EC element 110. FIGS. 7B and 7C illustrate a voltage between the first terminal pair and a voltage between the second terminal pair, respectively.

In the above case, a total period of the first application period $t_1$ and the second application period $t_2$ within one period T provides an application period t in which the drive voltage is applied to the EC element 110. Here, a period $T_1$ of the first drive pulse $P_1$ and a period $T_2$ of the second drive pulse $P_2$ are the same.

The first application period $t_1$ and the second application period $t_2$ may have an overlapped period in which those two periods partly overlap with each other. In such a case, the application period t is given by a time resulting from subtracting the overlapped period from the sum of the first application period $t_1$ and the second application period $t_2$ within one period T. The overlapped period is preferably not longer than a rising time of the drive voltage and not longer than 10 μs.

With the EC device according to this embodiment, the segregation in the EC element can be reduced. Moreover, with the EC device according to this embodiment, the segregation can be reduced without increasing the viscosity of the EC solution, namely without inviting the cause of reducing the response of the EC element.

Third Embodiment

The EC elements and the EC devices according to the above-described embodiments can be used in optical filters, lens units, image taking devices, window members, etc.

An optical filter according to a third embodiment includes the EC device according to one of the above-described embodiments, and further includes, as the drive means 120, an active element connected to the EC element. Examples of the active element include an amplifier element, a switching element (switching portion), etc. More specifically, examples of the active element include a transistor, an MIM element, etc. The transistor may include an oxide semiconductor, such as InGaZnO, in an active region.

A lens unit according to this embodiment includes an image-taking optical system including a plurality of lenses, and an optical filter including the EC device according to one of the above-described embodiments. The optical filter in this embodiment can adjust a quantity of light coming into the image-taking optical system through the EC device, or a quantity of light having passed through the image-taking optical system. The optical filter is preferably disposed on an optical axis of the lenses in the image-taking optical system. The optical filter may be disposed between the lenses included in the image-taking optical system, or outside a lens region.

Figure 5:
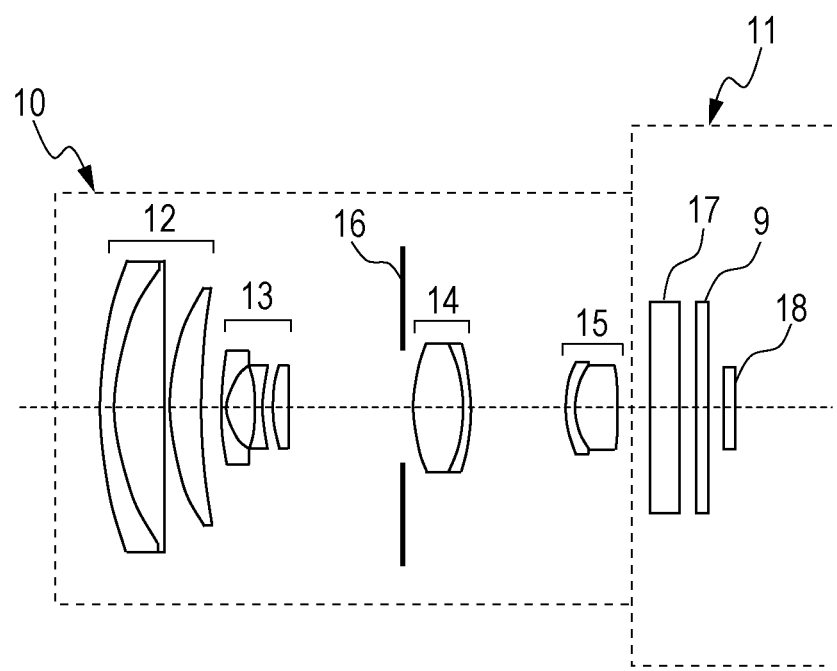
FIG. 5 is a schematic sectional view referenced to explain an example of configuration of an image taking device according to a third embodiment.

A configuration of an image taking device according to this embodiment will be described below with reference to FIG. 5. FIG. 5 is a schematic view referenced to explain an example of the configuration of the image taking device according to this embodiment.

The image taking device according to this embodiment includes a lens unit 10 and an image taking unit 11. The lens unit 10 is detachably connected to the image taking unit 11 through a mount member (not illustrated). An optical filter 9 is disposed inside the image taking unit 11.

The lens unit 10 includes a plurality of lenses or lens groups 12 to 15, and an aperture stop 16. The lens unit 10 constitutes a rear-focusing zoom lens in which focusing is carried out on the side closer to an image taking element 18 than the aperture stop 16. The lens unit 10 includes four lens groups, i.e., the first lens group 12 having positive refractive power, the second lens group 13 having negative refractive power, the third lens group 14 having positive refractive power, and the fourth lens group 15 having positive refractive power, which are successively arranged from the object side. The lens unit 10 further includes the aperture stop 16 between the second lens group 13 and the third lens group 14. Scaling is carried out by changing the interval between the second lens group 13 and the third lens group 14, and focusing is carried out by moving part of the fourth lens group 15.

The image taking unit 11 includes a glass block 17 and the image taking element 18. The optical filter 9 is disposed between the glass block 17 and the image taking element 18.

The glass block 17 includes a low-pass filter, a phase plate, color filters, etc. The image taking element 18 is a sensor unit for receiving light having passed through the lens unit 10, and it can be constituted using CCD, CMOS, or another type of image taking element. Alternatively, the image taking element 18 may be an optical sensor such as a photodiode. Thus, an element capable of obtaining and outputting information about the intensity or wavelength of light can be optionally utilized as the image taking element 18.

The individual components of the image taking device are arranged such that light having passed through the four lens groups 12 to 15, the aperture stop 16, and the optical filter 9 is received by the image taking element 18. A quantity of the light received by the image taking element 18 can be adjusted using the aperture stop 16 and the optical filter 9.

In the image taking device according to this embodiment, the optical filter 9 is disposed, by way of example, between the glass block 17 and the image taking element 18 in the image taking unit 11. However, the configuration of the image taking device is not limited to the above example, and the optical filter 9 may be disposed between two lens groups, for example, between the second lens group 13 and the third lens group 14, or outside the lens unit 10. The optical filter 9 is preferably disposed at a position where the light is focused, for the purpose of reducing an area of the optical filter.

In the image taking device according to this embodiment, the type of the lens unit 10 can also be selected as appropriate. Thus, the image taking device may be of, instead of the rear focusing type, the inner focusing type in which focusing is carried out on the side forward of the stop, or another suitable type. Other than the zoom lens, a special lens, such as a fisheye lens or a macro-lens, can also be selected as appropriate. An image taking device in which the lens unit 10 is detachable also falls within the scope of this embodiment. In that case, preferably, the image taking device includes the optical filter, and the optical filter is disposed to be positioned between the lens unit and the image taking element when the lens unit is attached.

The above-described image taking device can be applied to products including combination of a light-quantity adjuster and an image taking element, and it may constitute an image taking portion of, for example, a camera, a digital camera, a video camera, a digital video camera, a cellular phone, a smartphone, a PC, a tablet, etc.

By applying the EC device according to any of the above-described embodiments to an optical filter, a lens unit, or an image taking device, a light quantity can be reduced using the EC device. In such a case, since the segregation caused by the voltage distribution in the electrode of the EC device can be reduced using the EC device according to the above-described embodiment to a lower level than in the related art, accuracy of the optical filter can be improved.

Furthermore, with the image taking device according to this embodiment, the light quantity can be reduced without reducing a gain of the image taking element.

With the optical filter, the lens unit, and the image taking device according to this embodiment, the segregation in the EC element can be reduced. Therefore, reduction of the function caused by the segregation can be suppressed. In addition, since the segregation can be reduced without increasing the viscosity of the EC solution, namely without inviting the cause of reducing the response of the EC element, the optical filter, the lens unit, and the image taking device, each having high response, can be provided.

Fourth Embodiment

The EC device according to each of the above-described embodiment can be applied to window members. A window member according to a fourth embodiment includes a pair of substrates, the EC element 110 disposed between the pair of substrates, and an active element (drive means) 120 connected to the EC element 110. A quantity of light passing through the pair of substrates can be adjusted by the EC element 110. A window is obtained by combining the window member with a window frame, etc. The window member can be used in windows of cars, airplanes, buildings, etc.

In the window member using the EC element, the EC element is not always required to include the substrates 1*a* and 1*b* and the spacer 3, and it is just required to include a pair electrodes and an EC layer sandwiched between the pair of electrodes.

By applying the EC device according to any of the above-described embodiments to window members, the segregation caused by the voltage distribution in the electrode of the EC device can be reduced to a lower level than in the related art. With the window member according to this embodiment, therefore, reduction of the function caused by the segregation can be suppressed. In addition, since the segregation can be reduced without increasing the viscosity of the EC solution, namely without inviting the cause of reducing the response of the EC element, the window member having high response can be provided.

EXAMPLES

EXAMPLES of the electrochromic device according to the present invention will be described below.

Example 1

In EXAMPLE 1, the EC device 100 according to the first embodiment was fabricated, and characteristics of the EC device 100 were evaluated.

The EC element 110 was fabricated by forming, as the electrodes 2*a* and 2*b*, ITO transparent electrodes with sheet resistance of 10 $\Omega/\square$ on glass substrates (EAGLE-XG made by Corning Inc.) each having a thickness of 0.7 mm, and by using those glass substrates as the pair of substrates 1*a* and 1*b*.

Because of the EC element 110 according to this EXAMPLE having a rectangular shape, the pair of low-resistance wirings 5*a* and 5*b* were formed respectively along long sides of the substrates 1*a* and 1*b* of the EC element 110 outside the region 6. The low-resistance wirings 5*a* and 5*b* were each formed as a silver thick film with sheet resistance of 6.6 m$\Omega/\square$ (film thickness of 5 µm) by screen printing using a silver nanoparticle paste. A sheet resistance ratio of the silver thick film to the ITO electrode was 1/1000 or below.

Gap control particles (Micropearl SP (diameter of 50 μm) made by Sekisui Chemical Co., Ltd.) and a thermosetting epoxy resin (Structbond HC-1850 made by Mitsui Chemicals, Inc.) were mixed and kneaded together. By coating the mixture, a seal pattern having an opening for injection of an electrochromic medium therethrough was drawn on one substrate 1a. A dispenser was used to draw the seal pattern. An empty cell with an electrode gap of 50 μm was fabricated by bonding the substrate 1a and the substrate 1b to each other.

Then, the EC medium was prepared by dissolving an anodic EC material, a cathodic EC material, and cyanoethyl pullulan as a cyanoethyl polymer in a propylene carbonate solvent. A phenazine compound expressed by the following structural formula (1) was used as the anodic EC material, and a bipyridinium salt compound expressed by the following structural formula (2) was used as the cathodic EC material. Concentrations of the anodic EC material and the cathodic EC material were each 100 mM, and an addition amount of cyanoethyl pullulan was 30% by weight with respect to the solvent.

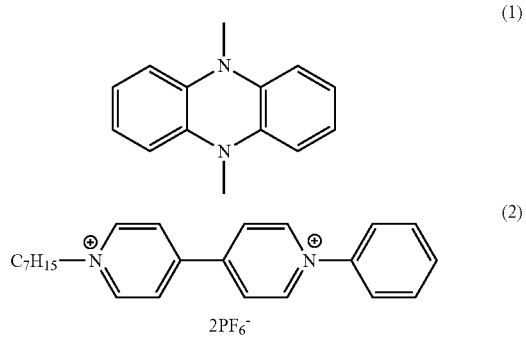

The above-mentioned EC medium was filled into the empty cell having the opening by a vacuum injection method, and the opening was sealed off using a ultraviolet curable epoxy resin. Lead wires were soldered to the low-resistance wirings, and the drive means 120 was connected to the lead wires. Thus, the EC device 100 capable of applying voltages in two channels was fabricated.

Element Evaluation

The EC element according to this EXAMPLE was horizontally placed on a heater. Evaluation of electrochemical and optical characteristics and appearance observation of the EC device 100 were conducted by driving the EC element in that state.

The EC element 110 was heated to 80° C. and colorized for one hour under conditions of the sweep-voltage peak value of 0.7 V (duty ratio 90%), the drive frequency of 26 kHz, and the channel switching frequency of 100 Hz. Thereafter, the terminals were short-circuited to the ground to decolorize the EC element, and a response speed was determined. In the above process, a time taken for the transmittance to return to 99% was about 2 sec. As a result of observing the appearance of the EC element while driving the EC element in a similar manner, the segregation was not found during the colorization process, and significant color separation was also not observed during the decolorization process.

Comparative Example 1

In COMPARATIVE EXAMPLE 1, the EC element 110 according to EXAMPLE 1 was driven by the related-art drive method of applying the drive pulse to only one of the two channels in the EC element 110.

The EC element 110 was heated to 80° C. and colorized for one hour by applying the drive pulse to the channel 1 under conditions of the sweep-voltage peak value of 0.7 V (duty ratio 90%) and the drive frequency of 26 kHz. Thereafter, the terminals were short-circuited to the ground to decolorize the EC element, and a response speed was determined. In the above process, a time taken for the transmittance to return to 99% was about 150 sec. As a result of observing the appearance of the EC element while driving the EC element in a similar manner, the segregation was found during the colorization process. Moreover, clearer color separation than that during the colorization process was observed during the decolorization process.

Example 2

An EC device according to EXAMPLE 2 is different from that according to EXAMPLE 1 in features of the EC element. In the EC element according to this EXAMPLE, the substrates 1a and 1b and the electrodes 2a and 2b were formed in the same manner as in EXAMPLE 1 by using the ITO transparent electrodes. However, the pair of low-resistance wirings were formed along the long sides of the EC element 110 by sputtering. Each of the formed low-resistance wirings was a silver thin film with sheet resistance of 16 mΩ/□ (film thickness of 1.2 μm). In the EC element according to this EXAMPLE, a titanium thin film having a film thickness of 50 nm was formed between the silver thin film and each of the electrodes 2a and 2b in order to increase adhesivity of the silver thin film serving as the low-resistance wiring. A sheet resistance ratio of the silver thin film to the ITO electrode was 1/625.

Element Evaluation

The EC element according to EXAMPLE 2 was horizontally placed on a heater. Evaluation of electrochemical and optical characteristics and appearance observation of the EC device were conducted by driving the EC element in that state.

The EC element 110 was heated to 80° C. and colorized for one hour under conditions of the sweep-voltage peak value of 0.7 V (duty ratio 90%), the drive frequency of 100 Hz, and the channel switching frequency of 100 Hz. Thereafter, the terminals were short-circuited to the ground to decolorize the EC element, and a response speed was determined. In the above process, a time taken for the transmittance to return to 99% was about 3 sec. As a result of observing the appearance of the EC element while driving the EC element in a similar manner, the segregation was not found during the colorization process, and significant color separation was also not observed during the decolorization process.

Comparative Example 2

EC elements were fabricated by setting the silver film thickness of the silver (/titanium) thin film to (A) 800 nm, (B) 200 nm, and (C) 0 in the EC element according to EXAMPLE 2, and they were driven exactly in the same manner as in EXAMPLE 2. Table 1 lists the results of measuring the time of decolorization response with respect to a reference for each element.

TABLE 1

| | Sheet Resistance of Low-Resistance Wiring (Silver film Thickness) | Sheet Resistance Ratio of Low-Resistance Wiring to Transparent Electrode | Decolorization Response (99%) |
|---|---|---|---|
| EXAMPLE 2 | 16 mΩ/□ (1200 nm) | 1:625 | 3 sec |
| COMPARATIVE EXAMPLE 2(A) | 30 mΩ/□ (800 nm) | 1:333 | 5 sec |
| COMPARATIVE EXAMPLE 2(B) | 140 mΩ/□ (200 nm) | 1:71 | 15 sec |
| COMPARATIVE EXAMPLE 2(C) | — (0) | 1:1 | 45 sec |

As a result of observing the element appearance while driving the EC element in a similar manner, significant segregation was not found during the colorization process and the decolorization process in EXAMPLE 2 and COMPARATIVE EXAMPLE 2(A). On the other hand, slight segregation was observed in an element lengthwise direction in COMPARATIVE EXAMPLE 2(B), and significant segregation was observed in the element lengthwise direction in COMPARATIVE EXAMPLE 2(C) even during the colorization process.

Comparative Example 3

In the above-described EXAMPLES, the drive pulses were alternately applied to the two channels such that the first application period $t_1$ and the second application period $t_2$ were not overlapped with each other. On the other hand, in COMPARATIVE EXAMPLE 3, drive pulses having the same shape were applied in phase to the channel 1 and the channel 2 such that drive voltages were simultaneously applied to the two channels. At that time, the drive voltage of the drive pulse applied to one of the two channels is set equal to that of the drive pulse applied to the other channel.

In this COMPARATIVE EXAMPLE, using the EC device 100 according to EXAMPLE 1, the EC element 110 was heated to 80° C. and colorized for one hour by applying the drive pulses in phase to the two channels under conditions of the sweep-voltage peak value of 0.7 V (duty ratio 90%) and the drive frequency of 100 Hz. Thereafter, the terminals were short-circuited to the ground to decolorize the EC element, and a response speed was determined. A time taken for the transmittance to return to 99% was about 30 sec. As a result of observing the appearance of the EC element while driving the EC element in a similar manner, during the colorization process, the EC element was strongly colorized on the side near each of the low-resistance wirings 5a and 5b, and colorization was weaker in a central portion of the effective light region. Thus, the segregation was found between the side near each of the low-resistance wirings 5a and 5b and the central portion. Furthermore, during the decolorization process, clearer color separation than that during the colorization process was observed.

In EXAMPLE 1, the current flows through the region 6 of the EC layer 4 between the A1 terminal side and the C1 terminal side or between the A2 terminal side and the C2 terminal side. On the other hand, in this COMPARATIVE EXAMPLE, when the drive pulses in phase are applied to the channel 1 and the channel 2, the drive voltages are applied to the channel 1 and the channel 2 at the same time. Therefore, when the current is easier to flow in the EC layer 4 than in the first and second electrodes 2a and 2b, the current flows between the A1 terminal side and the C2 terminal side and between the A2 terminal side and the C1 terminal side, and it does not flow through the region 6. Thus, it is thought that a reaction amount of the EC material on the side near each of the low-resistance wirings 5a and 5b increases, and that the segregation generates between the side near each of the low-resistance wirings 5a and 5b and the central portion as described above.

Comparative Example 4

In EXAMPLE 1, the first terminal pair A1-C1 was defined as the channel 1, the second terminal pair A2-C2 was defined as the channel 2, and the drive voltages were alternately applied to those two channels. On the other hand, in COMPARATIVE EXAMPLE 4, the drive voltages were alternately applied between the A1 terminal and the C2 terminal (channel 3) and between the A2 terminal and the C1 terminal (channel 4).

In this COMPARATIVE EXAMPLE, the EC element 110 was heated to 80° C. and colorized for one hour under conditions of the sweep-voltage peak value of 0.7 V (duty ratio 90%), the drive frequency of 26 kHz, and the switching frequency of 100 Hz between the channel 3 and the channel 4. Thereafter, those terminals were short-circuited to the ground to decolorize the EC element, and a response speed was determined. In the above process, a time taken for the transmittance to return to 99% was about 135 sec. As a result of observing the appearance of the EC element while driving the EC element in a similar manner, during the colorization process, the EC element was strongly colorized on the side near each of the low-resistance wirings 5a and 5b, and colorization was weaker in a central portion of the effective light region. Thus, the segregation was found between the side near each of the low-resistance wirings 5a and 5b and the central portion. Furthermore, during the decolorization process, clearer color separation than that during the colorization process was observed.

In EXAMPLE 1, the current flows through the region 6 of the EC layer 4 between the A1 terminal side and the C1 terminal side or between the A2 terminal side and the C2 terminal side. On the other hand, in this COMPARATIVE EXAMPLE, when the drive pulses in phase are applied to the channel 3 and the channel 4, the drive voltages are applied to the channel 3 and the channel 4 at the same time. Therefore, when the current is easier to flow in the EC layer 4 than in the first and second electrodes 2a and 2b, the current flows between the A1 terminal side and the C2 terminal side and between the A2 terminal side and the C1 terminal side, and it does not flow through the region 6. Thus, it is thought that a reaction amount of the EC material on the side near each of the low-resistance wirings 5a and 5b increases, and that the segregation generates between the side near each of the low-resistance wirings 5a and 5b and the central portion as described above.

The electrochromic device according to one aspect of the present invention can reduce the segregation in the EC element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electrochromic device comprising:
    an electrochromic element including an anode electrode, a cathode electrode, and an electrochromic layer positioned between the anode electrode and the cathode electrode; and
    drive means connected to the electrochromic element,
    wherein the electrochromic element includes a plurality of anode terminals electrically connected to the anode electrode and a plurality of cathode terminals electrically connected to the cathode electrode,
    each of the anode terminals constitutes a terminal pair in combination with one of the cathode terminals, and
    at least part of a first application period in which the drive means applies a voltage to a first terminal pair that is one of the terminal pairs and at least part of a second application period in which the drive means applies a voltage to a second terminal pair that is another one of the terminal pairs are not overlapped with each other.

2. The electrochromic device according to claim 1, wherein, among the anode terminals and the cathode terminals, the anode terminal and the cathode terminal constituting each of the terminal pairs are positioned with an effective light region of the electrochromic layer interposed therebetween.

3. The electrochromic device according to claim 1, wherein the electrochromic layer is a solution layer containing an anodic compound and a cathodic compound.

4. The electrochromic device according to claim 1, wherein the anode terminal constituting the first terminal pair and the anode terminal constituting the second terminal pair are positioned in opposing end portions of the anode electrode, and
    the cathode terminal constituting the first terminal pair and the cathode terminal constituting the second terminal pair are positioned in opposing end portions of the cathode electrode.

5. The electrochromic device according to claim 1, wherein the first application period and the second application period are not overlapped with each other.

6. The electrochromic device according to claim 1, wherein the second terminal pair is in an open state during the first application period, and the first terminal pair is in an open state during the second application period.

7. The electrochromic device according to claim 1, wherein, assuming N to be an integer of 2 or more, the electrochromic element includes a number N of terminal pairs including the first terminal pair and the second terminal pair, and
    the drive means applies, to the number N of terminal pairs, drive pulses having same shape and different phases shifted from one another by integer multiple of $2\pi/N$ radian.

8. The electrochromic device according to claim 1, wherein the drive means performs plural applications of the voltage to the first terminal pair and plural applications of the voltage to the second terminal pair in an alternate relation.

9. The electrochromic device according to claim 1, wherein the first application period and the second application period appear alternately.

10. The electrochromic device according to claim 1, wherein the electrochromic layer is a layer in which an optical transmittance is changed by redox reaction caused at the anode electrode and the cathode electrode.

11. The electrochromic device according to claim 1, wherein the drive means short-circuits the first terminal pair and the second terminal pair to a ground when an absorbance of the electrochromic layer in a colored state is to be reduced.

12. The electrochromic device according to claim 1, wherein the anode electrode includes two low-resistance wirings positioned in contact with the first anode terminal and the second anode terminal and having lower resistance than resistance of the anode electrode, and
    the cathode electrode includes two low-resistance wirings positioned in contact with the first cathode terminal and the second cathode terminal and having lower resistance than resistance of the cathode electrode.

13. The electrochromic device according to claim 12, wherein each of the anode electrode and the cathode electrode has a rectangular shape,
    the two low-resistance wirings of the anode electrode are positioned respectively along long sides of the anode electrode, and
    the two low-resistance wirings of the cathode electrode are positioned respectively along long sides of the cathode electrode.

14. The electrochromic device according to claim 12, wherein each of the anode electrode and the cathode electrode has a circular or elliptic shape,
    the two low-resistance wirings of the anode electrode are positioned along an outer periphery of the anode electrode, and
    the two low-resistance wirings of the cathode electrode are positioned along an outer periphery of the cathode electrode.

15. A lens unit comprising:
    an optical filter including the electrochromic device according to claim 1, and
    an image-taking optical system including a plurality of lenses.

16. An image taking device comprising:
    an image-taking optical system including a plurality of lenses;
    an optical filter including the electrochromic device according to claim 1; and
    an image taking element that receives light having passed through the optical filter.

17. An image taking device to which an image-taking optical system including a plurality of lenses is mountable, the image taking device comprising:
    an optical filter including the electrochromic device according to claim 1; and
    an image taking element that receives light having passed through the optical filter.

18. A window member comprising:
    a pair of substrates; and
    the electrochromic device according to claim 1,
    wherein the electrochromic element of the electrochromic device is positioned between the pair of substrates; and
    an amount of light passing through the pair of substrates is adjusted by the electrochromic device.

19. The electrochromic device according to claim 1, wherein the electrochromic layer changes a high transmittance to a low transmittance.

20. An electrochromic device comprising:
    an electrochromic element including an anode electrode, a cathode electrode, and an electrochromic layer positioned between the anode electrode and the cathode electrode; and
    drive means connected to the electrochromic element,
    wherein the electrochromic element includes a first anode terminal and a second anode terminal electrically connected to the anode electrode, and a first cathode terminal and a second cathode terminal electrically connected to the cathode electrode, the first anode terminal and the first cathode terminal constitute a first terminal pair, and the second anode terminal and the second cathode terminal constitute a second terminal pair, the drive means applies only a first voltage and a second voltage, the first voltage is a voltage between the first anode terminal and the first cathode terminal, the second voltage is a voltage between the second anode terminal and the second cathode terminal, and the electrochromic device further includes switching means that switches over application of the voltage to the first terminal pair by the drive means and application of the voltage to the second terminal pair by the drive means.

21. The electrochromic device according to claim 20, wherein the electrochromic layer changes a high transmittance to a low transmittance.

22. A drive method for an electrochromic element including an anode electrode, a cathode electrode, and an electrochromic layer positioned between the anode electrode and the cathode electrode, wherein the electrochromic element includes a plurality of terminal pairs that are connected to the anode electrode and the cathode electrode, and that apply voltages between the anode electrode and the cathode electrode, and at least part of a first application period in which the voltage is applied to one of the terminal pairs and at least part of a second application period in which the voltage is applied to another one of the terminal pairs are not overlapped with each other.

* * * * *